United States Patent [19]

Cha et al.

[11] Patent Number: 5,470,915
[45] Date of Patent: Nov. 28, 1995

[54] ABS RESINS HAVING IMPACT RESISTANCE AND LOW-GLOSS PROPERTIES AND PROCESSES FOR PREPARING THEM

[75] Inventors: Jin Y. Cha, Kyungnam; Kwang Y. Kim, Seoul, both of Rep. of Korea

[73] Assignee: Miwon Petrochemical Corporation, Seoul, Rep. of Korea

[21] Appl. No.: 266,837

[22] Filed: Jun. 28, 1994

[30] Foreign Application Priority Data

Jun. 28, 1993 [KR] Rep. of Korea .................. 93-11807

[51] Int. Cl.$^6$ ........................... C08L 51/04; C08L 55/02
[52] U.S. Cl. ...................... 525/86; 525/314; 525/316; 525/52
[58] Field of Search ....................... 525/86, 314, 316, 525/52

[56] References Cited

U.S. PATENT DOCUMENTS

| | | | |
|---|---|---|---|
| 4,141,953 | 2/1979 | Bracke | 525/243 |
| 4,239,863 | 12/1980 | Bredweg | 525/263 |
| 4,277,574 | 7/1981 | Jastrzebski | 525/86 |
| 4,417,030 | 11/1983 | Aliberti | 525/316 |
| 4,690,959 | 2/1987 | Alle | 525/316 |
| 4,703,090 | 10/1987 | Ferraresi | 525/246 |
| 5,041,498 | 8/1991 | Hare | 525/71 |
| 5,210,132 | 5/1993 | Matsubara | 525/53 |
| 5,225,494 | 7/1993 | Ishiga | 525/316 |
| 5,278,253 | 1/1994 | Baumgartner | 525/316 |
| 5,414,045 | 5/1995 | Sue | 525/86 |

FOREIGN PATENT DOCUMENTS

| | | |
|---|---|---|
| 59-89346 | 5/1984 | Japan . |
| 60-44517 | 3/1985 | Japan . |
| 1-31159 | 12/1989 | Japan . |
| 89-3543 | 9/1989 | Rep. of Korea . |
| 93-6912 | 9/1993 | Rep. of Korea . |

*Primary Examiner*—Joseph L. Schofer
*Assistant Examiner*—I. Zemel
*Attorney, Agent, or Firm*—Kenyon & Kenyon

[57] ABSTRACT

The present invention relates to ABS (Acrylonitrile-Butadiene-Styrene) resins having excellent impact resistance, low-gloss properties and superior heat resistance, and to a process for preparing them. In particular, between 5 wt % and 20 wt % butadiene rubber having double bonds is dissolved in between 30 wt % and 70 wt % graft-copolymerizing aromatic vinyl monomer and between 10 wt % and 50 wt % cyanized vinyl monomer. Polymerization controller and radical initiator are added to the above, and the mixture polymerized in a first step of bulk polymerization at a temperature of 80°–120° C. while stirring until polymerization proceeds to between 20 and 50% of completion. Between 40% and 70% α-methyl styrene monomer, between 10 wt % and 40 wt % unsaturated nitrile and between 5 wt % and 15 wt % butadiene rubber are then added to the polymerized mixture and the resulting mixture stirred for 30–60 minutes in a second step of bulk polymerization. Finally, distilled water and a suspending agent are added to disperse the mixture, which is then polymerized with a radical catalyst in a final step of suspension polymerization.

16 Claims, 1 Drawing Sheet

ABS RESINS HAVING IMPACT RESISTANCE AND LOW-GLOSS PROPERTIES AND PROCESSES FOR PREPARING THEM

FIELD OF THE INVENTION

The present invention relates to ABS (Acrylonitrile-Butadiene-Styrene) resins having excellent impact resistance, low-gloss properties and heat resistance, and to processes for preparing them. More particularly, the present invention relates to a process of bulk-suspension polymerization and to ABS resins with low-gloss properties obtained by this process, characterized in that the process consists of a first step of bulk polymerization and a second step of suspension polymerization in which rubber solution is added. Since the ABS resins of the present invention are prepared by the addition of the rubber solution in the second step of bulk-suspension polymerization, they have excellent heat resistance, mechanical properties and outstanding low-gloss properties. The ABS resins of the present invention may be used, for example, as a material for internal and/or external automobile parts such as instrument panels, glove boxes, console boxes, facia panel housings, rear panels, radiator grills and so forth.

BACKGROUND OF THE INVENTION

Known ABS resins, which have excellent heat resistance, impact resistance, molding-processability and surface gloss have been widely used as a material for industrial parts. For example, these resins have been used in the internal and/or external parts of automobiles, toys, office devices, and so forth. Known methods for preparing ABS resin are emulsion polymerization and bulk continuous polymerization.

However, there are situations where a low-gloss surface is desired. For example, where ABS resin is to be used for the internal parts of automobiles, a low-gloss surface is required to prevent problems in which the driver's field of vision is obstructed due to surface gloss.

Known methods for preparing a low-gloss resins include methods wherein the resin surface is embossed or provided with a low-gloss coating. Moreover, Japanese Unexamined Patent Publication No. 60-44517 discloses a method for reducing compatibility between the phases used or for using a polybutadiene latex of large particle size during the process for preparing the ABS resin. In addition, Japanese Unexamined Patent Publication No. 59-89346 discloses low-gloss ABS resins that include olefin copolymers having epoxy groups. Finally, Korean Patent Publication No. 93-6912 discloses a method of achieving low-gloss properties by finishing bulk polymerization before stabilizing the rubber particles so that after phase inversion, the rubber particles do not have spherical shapes but rather are split.

However, the above embossing method is problematic in that the gloss on resin surface is strongly influenced by the molding conditions. And the above low-gloss coating method, while providing a low-gloss resin, results in molded products that have poor mechanical properties at high cost.

Japanese Unexamined Patent Publication No. 60-44517 has the following problems: (1) the gloss level is not uniform and varies according to the additives used and the injection conditions; (2) control of the reaction time is difficult during polymerization; and (3) the mechanical properties such as impact strength and so forth are greatly decreased, because the composition contains excessive non-grafted rubber particles in the ABS resin compositions.

Japanese Unexamined Patent Publication No. 59-89346 has problems associated with control of the gloss level. Control of the gloss level is difficult because the gloss level is highly sensitive to changes in the mixing ratio of copolymers having epoxy groups. Moreover, in cases of molding at high temperatures, gloss may be increased, while impact strength and fluidity are decreased due to low compatibility between the constituent resins.

Finally, Korean Patent Publication No. 93-6912 has the following problems: (1) due to early completion of bulk polymerization before phase inversion, less monomer-occluded rubber particles are formed, and impact strength is thus decreased; and (2) since the obtained products have the same heat resistance as general ABS resins, they may not be used for products requiring higher heat resistance such as the internal parts of automobiles.

In conducting research to solve the above problems, the inventors unexpectedly discovered that impact resistant ABS resins having excellent low-gloss properties, heat resistance and mechanical properties can be prepared in accordance with a bulk/suspension polymerization process wherein the conditions and the extent of polymerization are controlled in each reaction step to form rubber particles of defined size and shape.

SUMMARY OF THE INVENTION

An object of the present invention is to provide an ABS resin having excellent heat resistance and mechanical properties, while at the same time having excellent low-gloss properties. Another object of the present invention is to provide a method of preparing the same by bulk/suspension polymerization.

According to an embodiment of the invention, an ABS resin having high-impact resistance and desirable low-gloss properties is prepared by bulk/suspension polymerization. Monomer-occluded spherical rubber particles are formed in a first step of bulk/polymerization from a solution of polybutadiene rubber dissolved in styrene-acrylonitrile, as well as one or more chain transfer agents and one or more radical initiators. Lengthwise-torn rubber particles (monomer-occluded spherical rubber particles that have been split) and splinter-shaped rubber particles are formed in a second step of bulk polymerization by adding a solution of polybutadiene rubber dissolved in α-methyl styrene-acrylonitrile.

According to another embodiment of the present invention, ABS resin may be prepared according to the following steps:

a) between 5 wt % and 20 wt % butadiene-type rubber having double bonds is dissolved in a solution of between 30 wt % and 70 wt % graft-copolymerizing aromatic vinyl monomer and between 10 wt % and 50 wt % cyanized vinyl monomer; polymerization controller and radical initiator are added to form a first mixture, and the first mixture is polymerized at a temperature of about 80° to about 120° C. while stirring until polymerization is between about 20 and 50% complete as first a step of bulk polymerization;

b) a second mixture consisting of between 40 wt % and 70 wt % α-methyl styrene monomer, between 10 wt % and 40 wt % unsaturated nitrile and between 5 wt % and 15 wt % butadiene rubber is added and the resulting solution stirred for about 30–60 minutes at about 60°–70° C. as a second step of bulk polymerization; and c) distilled water and suspension agent are added to disperse the resulting mixture, and polymerization is conducted with a radical catalyst in a suspension polymerization step.

DETAILED DESCRIPTION OF THE INVENTION

Figure 1:
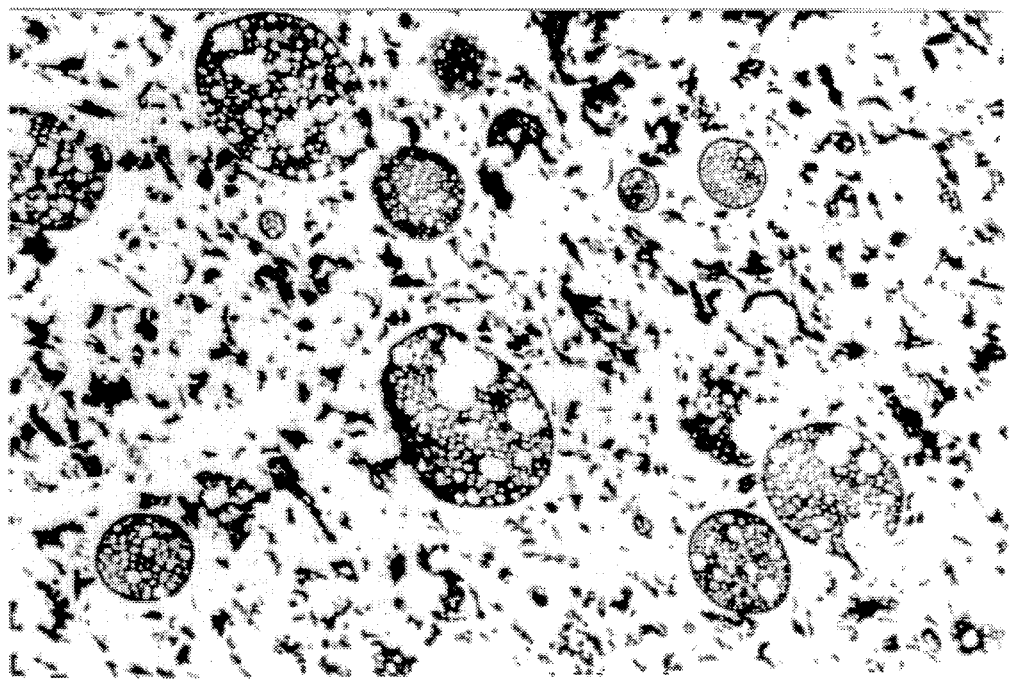
FIG. 1 is a transmission electron microscope (TEM) photograph of 10,000× magnification of a cross-section of the product produced according to Example 4 of the present invention.
Figure 2:
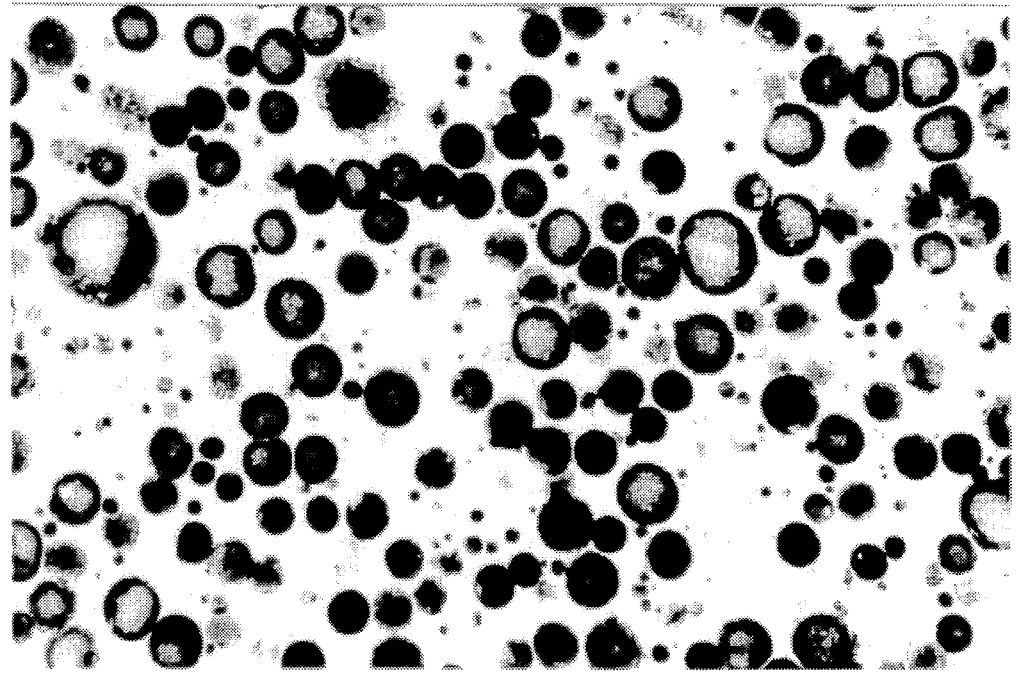
FIG. 2 is a transmission electron microscope (TEM) photograph of 30,000× magnification of a prior ABS resin prepared by emulsion polymerization.

The present invention relates to ABS thermoplastic resin compositions having excellent low-gloss properties that are prepared by a bulk/suspension polymerization process.

According to an embodiment of the present invention, an aromatic vinyl monomer such as styrene monomer (SM), α-methyl styrene (α-MS), p-methyl styrene (p-MS), vinyl toluene, t-butyl styrene or chlorostyrene, may be used in a first mixture which is used in a first bulk polymerization step in an amount between about 20 wt % and about 70 wt %, based on a first mixture weight of 100 wt %. If the aromatic vinyl monomer is present at less than about 20 wt % in the first mixture, then the fluidity of the resultant thermoplastic resin may be decreased, and if it is present at more than about 70 wt %, then the heat resistance and the impact resistance of the resultant resin may be decreased.

Between about 10 wt % and about 50 wt % of a cyanized vinyl monomer such as acrylonitrile or methacrylonitrile may be used in the first mixture, based on a first mixture weight of 100 wt %. If the cyanized vinyl monomer is less than about 10 wt %, then the chemical resistance of the resultant resin may be decreased, and if it is more than about 50 wt %, the mechanical properties of the resin may be decreased.

A rubber which can be grafted into a styrene-acrylonitrile matrix, such as polybutadiene rubber, styrene-butadiene rubber, EPDM rubber (terpolymer from ethylene-propylene diene monomer) and so forth, may be used in the first mixture for the first step of bulk polymerization. To enhance suspension polymerization, it is preferable to use a polybutadiene rubber wherein the cis-form comprises more than 30% of the rubber and wherein a solution viscosity of less than 100 centipoise results when the rubber is present at a concentration of 5% in styrene monomer. The rubber is preferably present at concentration of about 5 to about 20 wt % based on a first mixture weight of 100 wt %.

Polymerization controller, such as aliphatic or aromatic mercaptan, may be used in amount between about 0.01 wt % and about 0.3 wt % based on a first mixture weight of 100 wt %.

Internal lubricant, such as purified mineral oil, paraffin wax or a mixture thereof or butyl stearate, may also be used. In particular, mineral oil is preferably used in the present invention in an amount between about 0.05 wt % and about 5.0 wt % based on a first mixture weight of 100 wt %.

A catalyst, such as isopropyl peroxy decarbonate, cumene hydroxy peroxide, benzoyl peroxide, t-butyl perbenzoate (TBPB) and so forth, may be used in amounts between about 0.05 wt % and about 0.5 wt % based on a first mixture weight of 100 wt %.

In a second step of suspension polymerization, rubber solutions are added to effectively control gloss level and mechanical properties such as impact resistance, as well as to control the rubber content and prevent phase inversion.

As a result, lengthwise-torn rubber particles and splinter-shaped rubber particles are formed and, along with the monomer-occluded spherical rubber particles formed in the first step, they comprise the present ABS resins having excellent low-gloss properties and impact resistance.

According to an embodiment of the present invention, aromatic vinyl monomers such as α-methyl styrene or p-methyl styrene may be used in a second mixture that is separately added in a second step of bulk polymerization in amount between about 20 wt % and about 70 wt %, based on a second mixture weight of 100 wt %. If the aromatic vinyl monomer is present at less than about 20 wt %, the heat resistance may be decreased, and if it is present at more than about 70 wt %, pyrolysis of resin occurs easily and processability may be decreased.

Cyanized vinyl monomer such as acrylonitrile or methacrylonitrile may be used in an amount between about 10 wt % and about 60 wt %, more preferably between about 10 wt % and about 40 wt %, based on a second mixture weight of 100 wt % to form a matrix by copolymerizing with the aromatic vinyl monomer.

Rubber separately added in the second step, for example polybutadiene, may be used in amount between about 5 wt % and about 15 wt % based on a second mixture weight of 100 wt %. To enhance suspension polymerization, it is preferable to use a polybutadiene rubber wherein the cis-form comprises more than 30% of the rubber and where a solution viscosity of less than 100 centipoise results when the rubber is present at a concentration of 5% in styrene monomer. If the amount of rubber is less than about 5 wt %, the low-gloss effect may be greatly decreased, if the amount of rubber is more than about 20 wt %, it may be difficult to create a suspension, due to the high viscosity of the rubber solution.

According to an embodiment of the invention, the product of the second bulk polymerization is subjected to a final suspension polymerization step. In this step, a suspension agent such as tricalcium phosphate and a radical initiator such as those set forth above are added. A surfactant such as soap may also be added. Once distilled water is provided to form a suspension, the suspension can be heated and stirred until the polymerization is completed.

After suspension polymerization, the suspension agent attached to the obtained polymer bead is removed with acid solution.

According to an embodiment of the present invention, in the first step of bulk polymerization, monomer-occluded spherical rubber particles of 3–5µ size are formed. The shape and size of the rubber particles are influenced by the stirring rate, which can be, for example, 150–170 rpm, and the extent of polymerization, which is preferably 20–50%. In the second step of bulk polymerization, lengthwise torn rubber particles of 1–2µ in size and splinter-shaped rubber particles of 0.1–0.5µ in size are formed, whose shape and size are influenced by the addition of the solution of the butadiene rubber in acrylonitrile monomer and α-methyl styrene monomer.

The ABS resin prepared according to the present invention includes 20–50% spherical rubber particles, 10–40% lengthwise torn rubber particles and 10–60% splinter-shaped rubber particles based on the entire resin composition.

As a result of the above, the ABS resins prepared in accordance with the present invention have excellent impact resistance, low-gloss and superior mechanical properties.

Also, owing to their lower rubber content than emulsion ABS resins, the ABS resins of the present invention have excellent atmospheric resistance and thermal stability, and their gloss level can be readily controlled.

The ABS resins of the present invention can be used for preparing molded products. In particular, excellent low-gloss properties are maintained during molding owing to the mixture of the large spherical rubber particles and lengthwise torn rubber particles.

Other embodiments of the invention will be apparent to those skilled in the art from a consideration of this specification or practice of the invention disclosed herein. It is intended that the above specification and examples to follow be considered as exemplary only, with the true scope and spirit of the invention being indicated by the following claims.

EXAMPLES

Example 1

A first rubber solution was prepared by dissolving 1575 g polybutadiene rubber in a solution of 10245 g styrene monomer and 3105 g acrylonitrile. 150 g mineral oil were added as a plasticizer and 70 g t-dodecyl mercaptan (TDM) were added as a molecular weight controller to the dissolved rubber at room temperature in a first 100 l (reactor A). At the same time, 1800 g polybutadiene dissolved in solution of 10095 g α-methyl styrene and 2955 g acrylonitrile as well as 150 g mineral oil and 10 g TDM were added to a second 100 l (reactor B) at room temperature.

As a first polymerization step, 6 g benzoyl peroxide (BPO) were added as a polymerization initiator in the rubber solution prepared in reactor A and the mixture allowed to polymerize while stirring at a rate of 160 rpm at 85° C. to achieve an extent of polymerization of between 20 wt % and 50 wt %.

As a second polymerization step, the rubber solution prepared in reactor B was added to the above prepolymer having an extent of polymerization of 20–50 wt % and stirred for 30–60 mins.

The mixed prepolymer was then completely polymerized by the following suspension-polymerization method: first, 750 g tricalcium phosphate (TCP) were dissolved in 7 kg distilled water and added to the product of the second polymerization; then 250 g soap were added as a surfactant to create a suspension; 30 kg distilled water were then added to completely suspended the prepolymer; after stabilizing the suspension, 60 g t-butyl perbenzoate (TBPB) were added as a polymerization initiator at stirring rate of 180 rpm; then the reaction temperature was increased to 100° C. to polymerize the suspension; and when polymerization was more then 90% complete, the temperature was increased to 130° C. to finish the polymerization.

After finishing the polymerization, the TCP used as a suspension agent was completely dissolved with dilute hydrochloric acid and removed to obtain the desired bead-shaped polymer.

Test results concerning properties of the obtained polymer are shown in Table 1.

Example 2

A polymer was prepared by the same process as in Example 1 above, except that 7050 g α-methyl styrene and 6000 g acrylonitrile were added to reactor B. The results are shown in Table 1.

Example 3. A polymer was prepared by the same process as in Example 1 above, except that 7800 g α-methyl styrene and 5250 g acrylonitrile were added to reactor B. The results are shown in Table 1.

Example 4. A polymer was prepared by the same process as in Example 1 above, except that 8250 g α-methyl styrene and 4800 g acrylonitrile were added to reactor B. The results are shown in Table 1.

Comparative Example 1

3375 g polybutadiene rubber was dissolved in a solution of 20340 g styrene monomer and 6060 g acrylonitrile, and 300 g mineral oil as plasticizer and 80 g t-dodecylmercaptan(TDM) as molecular weight controller were added to the above.

15 g Benzoyl peroxide(BPO) as polymerization initiator was added to the rubber solution which was polymerized at 85° C. at a stirring rate of 160 rpm until polymerization was 30% complete. After cooling to room temperature, a suspension agent was added to suspend the solution.

After stabilizing the suspension, 100 g t-butyl perbenzoate(TBPB) was added as a polymerization initiator while stirring at a rate of 180 rpm. Then, the reaction temperature was increased to 100° C. to polymerize the suspension.

When polymerization was finished, the suspension agent in the obtained polymer bead was completely dissolved with dilute hydrochloric acid.

Comparative Example 2

3375 g polybutadiene rubber was dissolved in a solution of 20340 g styrene monomer and 6060 g acrylonitrile, and 300 g mineral oil as plasticizer and 80 g t-dodecyl mercaptan(TDM) as molecular weight controller were added to the above.

At the same time, 1500 g TCP was dissolved in 14 kg distilled water and 500 g soap was mixed in as a surfactant to prepare a suspension agent. 30 kg distilled water and the above monomer mixture were then added to completely suspend the prepolymer.

After stabilizing the suspension, 100 g t-butyl perbenzoate(TBPB) was added as a polymerization initiator while stirring at a rate of 180 rpm. Then, the reaction temperature was increased to 100° C. to polymerize the suspension.

When polymerization was more than 90% complete, the temperature was increased to 130° C. to finish the polymerization.

After finishing the polymerization, the TCP used as a suspension agent was completely dissolved with dilute hydrochloric acid.

TABLE 1

| Properties | Ex. 1 | Ex. 2 | Ex. 3 | Ex. 4 | Comparative Ex. 1 | Comparative Ex. 2 |
|---|---|---|---|---|---|---|
| Impact Strength[1] | 18.0 | 14.0 | 14.7 | 15.1 | 11.0 | 9.4 |
| Tensile Strength[2] | 380 | 420 | 370 | 430 | 420 | 370 |
| Gloss Level[3] | 5.8 | 5.0 | 6.5 | 6.2 | 34.0 | 19.0 |
| Heat Distortion[4] | 98 | 97 | 96 | 101 | 87 | 86 |

[1]Impact strength measured by method ASTM D256, 6.4 mm notched, kg · cm/cm
[2]Tensile strength measured by method ASTM D638, kg/cm$^2$
[3]Gloss level measured by method KSA 0069 GS (45°), %
[4]Heat distortion temperature (or) measured by method ASTM D648, 6.4 mm, 18.6 kg/cm$^2$ · °C.

The percentage areas of rubber particles of different sizes were also determined from the TEM photograph of the obtained polymers as seen in Table 2.

The areas obtained in (1), (2) and (3) of Table 2 were added to give total areas and then the percentage areas of the respective particles were calculated.

TABLE 2

| Rubber Particles | Ex. 1 | Ex. 2 | Ex. 3 | Ex. 4 | Comparative Ex. 1 | Comparative Ex. 2 |
|---|---|---|---|---|---|---|
| 2.5μ Spherical[1] | 25% | 50% | 46% | 43% | 70% | 2% |
| 1–2μ Lengthwise Torn[2] | 26% | 26% | 19% | 30% | 20% | 6% |
| 0.1–05μ Splinter-shaped[3] | 49% | 24% | 35% | 27% | 10% | 92% |

[1]The area of spherical rubber particles was calculated according to the method of calculating the area of circles.
[2]The area of lengthwise torn rubber particles was calculated as the area of rectangles
[3]The area of splinter-shaped rubber particles was calculated as the area of circles and rectangles.

What is claimed is:

1. A process for preparing an ABS resin having low-gloss properties comprising:
   a) dissolving between 5 wt % and 20 wt % of a first rubber in a solution of between 30 wt % and 70 wt % of a first aromatic vinyl monomer and between 10 wt % and 50 wt % of a first cyanized vinyl monomer; adding a polymerization controller and radical initiator to form a first reaction mixture; and polymerizing the first reaction mixture at a temperature ranging from about 80° to 120° C. while stirring to achieve an extent of polymerization of between 20 and 50% as first step of bulk polymerization;
   (b) adding a second reaction mixture consisting of between 40 wt % and 70 wt % of a second aromatic vinyl monomer, between 10 wt % and 40 wt % of a second cyanized vinyl monomer and between 5 wt % and 15 wt % of a second rubber; and stirring for an additional 30 to 60 minutes as second step of bulk polymerization; and
   (c) adding distilled water and a suspending agent to disperse the mixture; and polymerizing with a radical catalyst as step of suspension polymerization.

2. The process as defined in claim 1, wherein said first aromatic vinyl monomer is selected from styrene monomer, α-methyl styrene, p-methyl styrene, vinyl toluene, t-butyl styrene or chlorostyrene.

3. The process as defined in claim 1, wherein said first aromatic vinyl monomer is α-methyl styrene.

4. The process as defined in claim 1, wherein said first cyanized vinyl monomer is selected from acrylonitrile or methacrylonitrile.

5. The process as defined in claim 1, wherein said first rubber is selected from polybutadiene rubber, styrene-butadiene rubber, and EPDM rubber.

6. The process as defined in claim 1, wherein polymerization controller is selected from an aliphatic mercaptan and an aromatic mercaptan.

7. The process as defined in claim 6, wherein said polymerization controller is provided in an amount between 0.001 wt % and 0.3 wt % of the first reaction mixture.

8. The process as defined in claim 1, wherein said radical initiator is a catalyst selected from isopropyl peroxy decarbonate, cumene hydroxy peroxide, benzoyl peroxide, and t-butyl perbenzoate.

9. The process as defined in claim 8, wherein said radical initiator is provided in a amount between 0.005 wt % and 0.5 wt % of the first reaction mixture.

10. The process as defined in claim 1, wherein said second aromatic vinyl monomer is selected from α-methyl styrene and p-methyl styrene.

11. The process as defined in claim 1, wherein said second cyanized vinyl monomer is selected from acrylonitrile or methacrylonitrile.

12. The process as defined in claim 1, wherein said second rubber is polybutadiene rubber.

13. The process as defined in claim 12, wherein said polybutadiene rubber comprises more than 30% cis-form and has a solution viscosity is below 100 centipoise at a concentration of 5% in styrene monomer.

14. The process as defined in claim 1, wherein said suspending agent is tricalcium phosphate.

15. The process as defined in claim 1, wherein said radical catalyst is selected from isopropyl peroxy decarbonate, cumene hydroxy peroxide, benzoyl peroxide, and t-butyl perbenzoate.

16. The process of claim 1 wherein said first step of bulk polymerization forms monomer-occluded spherical rubber particles of which 20–50% are 3–5μ in size, and wherein said second step of bulk polymerization forms lengthwise torn rubber particles of which 10–40% are 1–2μ in size and splinter-shaped rubber particles of which 10–60% are 0.1–0.5μ in size.

* * * * *